(12) United States Patent
Xie et al.

(10) Patent No.: US 8,670,882 B2
(45) Date of Patent: Mar. 11, 2014

(54) SYSTEMS AND METHODS FOR MONITORING NAVIGATION STATE ERRORS

(75) Inventors: Gang Xie, Fullerton, CA (US);
  Mangesh Chansarkar, Irvine, CA (US);
  Sanjai Kohli, Torrance, CA (US)

(73) Assignee: CSR Technology Inc., San Jose, CA (US)

( * ) Notice: Subject to any disclaimer, the term of this patent is extended or adjusted under 35 U.S.C. 154(b) by 1453 days.

(21) Appl. No.: 12/061,726

(22) Filed: Apr. 3, 2008

(65) Prior Publication Data

US 2009/0254275 A1 Oct. 8, 2009

(51) Int. Cl.
  *G06F 19/00* (2011.01)
  *G01C 21/00* (2006.01)
  *G05D 1/06* (2006.01)
  *G01S 19/42* (2010.01)
  *G01S 19/07* (2010.01)
  *G01C 21/26* (2006.01)

(52) U.S. Cl.
  CPC ............ *G05D 1/0676* (2013.01); *G01S 19/42* (2013.01); *G01S 19/07* (2013.01); *G01C 21/26* (2013.01); *G01C 21/005* (2013.01)
  USPC ............ 701/16; 701/469; 701/470; 701/517; 701/518

(58) Field of Classification Search
  None
  See application file for complete search history.

(56) References Cited

U.S. PATENT DOCUMENTS

| | | | |
|---|---|---|---|
| 6,067,484 A * | 5/2000 | Rowson et al. | 701/16 |
| 6,411,892 B1 | 6/2002 | Van Diggelen | |
| 6,417,801 B1 | 7/2002 | Van Diggelen | |
| 6,429,814 B1 * | 8/2002 | van Diggelen et al. | 342/357.33 |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,704,651 B2 | 3/2004 | Van Diggelen | |
| 7,138,942 B2 * | 11/2006 | Trautenberg | 342/357.44 |
| 2002/0198657 A1 * | 12/2002 | Robbins | 701/214 |
| 2010/0019960 A1 * | 1/2010 | van Diggelen et al. | 342/357.02 |

* cited by examiner

*Primary Examiner* — Ryan Zeender
*Assistant Examiner* — Denisse Ortiz Roman
(74) *Attorney, Agent, or Firm* — RatnerPrestia

(57) ABSTRACT

Systems and methods for monitoring navigation state errors are provided. In this regard, a representative system, among others, includes a receiver that is configured to receive GPS signals and calculate pseudorange (PR) residuals, the receiver including a navigation state error manager that is configured to: calculate a distance traveled by the receiver having the PR residuals, determine whether a navigation state has errors based on the calculated PR residuals and calculated distance, and responsive to determining that the navigation state has errors, send an error message indicating that the navigation state has errors.

24 Claims, 7 Drawing Sheets

SYSTEMS AND METHODS FOR MONITORING NAVIGATION STATE ERRORS

TECHNICAL FIELD

The present disclosure is generally related to global positioning system (GPS) technology and, more particularly, is related to systems and methods for monitoring navigation state errors.

BACKGROUND

Typically, a global positioning system (GPS) can provide a user with a position, velocity, and time (PVT) solution, sometimes referred to as a navigation solution. The global positioning system includes a GPS receiver, which typically incorporates current measurements from four or more GPS satellites to update its most recent PVT solution using some navigation algorithm. One such measurement is the pseudorange measurements which can be referred to as the range or distance between a satellite and the GPS receiver. The satellites positions can be calculated for any point in time with known satellite orbital parameters, which are broadcast by the satellites.

The pseudorange measurements can be computed using measured time of signal transmission from the satellite to the GPS receiver, multiplied by the speed of light. Pseudorange measurements are called "pseudo" since the internal clock time of the receiver and GPS time are normally unsynchronized resulting in an unknown, such as, the receiver clock offset $\Delta t$, among others, that is typically computed by the navigation algorithm. Thus, with at least four signals, solutions for the receiver position along the x-, y-, z- and $\Delta t$-axes can be computed.

GPS measurements can be affected by multipath signals, where the GPS signals reflect off, for example, surrounding terrain, buildings, canyon walls, and hard ground, among other structures. When a signal is reflected, the signal typically passes through a longer path than the corresponding direct-path signal. Thus, the multipath signal can affect the pseudorange measurements, resulting in potential unexpected errors. In fact, multipath is the main contributor of error to the pseudorange measurement. One metric of determining the validity of the pseudorange measurement is through the use of pseudorange residual. Pseudorange residual is calculated as the difference between the pseudorange and the estimated range obtained from the navigation solution.

GPS receiver typically implements algorithms that contain some Failure Detection and Exclusion (FDE) algorithm operating on the pseudorange residual to detect and exclude failed pseudorange measurements from the navigation algorithm. Many FDE functions can determine whether the pseudorange measurements are normal or failures based typically on the magnitude of the pseudorange residuals. It should be noted that since one pseudorange measurement typically corresponds to a pseudorange residual, these two terms sometimes can be exchanged. For example, processing pseudorange measurement residual has the same meaning as processing pseudorange measurement.

A large pseudorange residual typically indicates a failure or a potential failure. The FDE function can either exclude or de-weight the failed measurements in the navigation computation. However, the integrity and accuracy of the pseudorange residual also depends on the estimated range which is calculated from the navigation state in the navigation algorithm. Navigation state includes information associated with, but not limited to, the position, velocity, clock offset, and clock drift of the receiver, among others. If there is a large navigation state error then the FDE may erroneously exclude good or accept bad pseudorange measurements, resulting in a high probability of false alarm or miss detection. Excluding good measurements can also adversely affect satellite geometry distribution or, in other words, dilution of position (DOP), which, in turn, can magnify measurement errors into position solution errors. Accepting bad pseudorange measurements can make a navigation algorithm deliver a bad GPS fix.

Thus, there is a need to differentiate whether the large pseudorange residual is due to large navigation state error or due to pseudorange measurement error such as induced by multipath. Appropriate action can then be taken to either correct the navigation state error or to accept the pseudorange measurement.

SUMMARY

Systems and methods for monitoring navigation state errors are provided. The disclosure differentiates between navigation state error and pseudorange measurement error as the source of large pseudorange residual by taking advantage of their different spatial temporal property. Pseudorange measurement has multipath as its main source of error. Multipath is a dynamic phenomenon that exhibits dynamic spatial temporal property. For example, even though multipath can persist when a receiver is stationary, it is very sensitive to receiver location and motion, Thus, multipath does not tend to persist over time and distance for a given satellite. In contrast, navigation states of some navigation filtering algorithm often change smoothly and slowly, and thus navigation state error is not sensitive to spatial or temporal variation and can persist over time and distance. Meanwhile, though different satellites have a different multipath phenomenon, their pseudorange residuals can be calculated based on the same navigation states. Therefore, for example, if pseudorange residuals are used for test statistic in FDE, the pseudorange residuals can show different spatial temporal property when the failure is from navigation state and from satellite multipath. This property provides a method for identifying navigation state error from measurement errors.

In this regard, a representative system, among others, includes a receiver that is configured to receive GPS signals and calculate pseudorange (PR) residuals based on the GPS signals, the receiver including a navigation state error manager that is configured to: calculate a distance traveled by the receiver having the PR residuals, determine whether a navigation state of the receiver has errors based on the calculated PR residuals and calculated distance, and responsive to determining that the navigation state has errors, send an error message indicating that the navigation state has errors.

A representative method, among others, for monitoring navigation state errors comprises the following steps: receiving GPS signals from signal sources by a receiver; calculating pseudorange (PR) residuals based on the received GPS signals; calculating a distance traveled by the receiver having the PR residuals; determining whether a navigation state of the receiver has errors based on the calculated PR residuals and calculated distance; and responsive to determining that the navigation state has errors, sending an error message indicating that the navigation state has errors.

Other systems, methods, features of the invention will be or will become apparent to one skilled in the art upon examination of the following figures and detailed description. It is intended that all such systems, methods, features be included within the scope of the invention, and be protected by the accompanying claims.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which navigation state errors are monitored.

Figure 1:
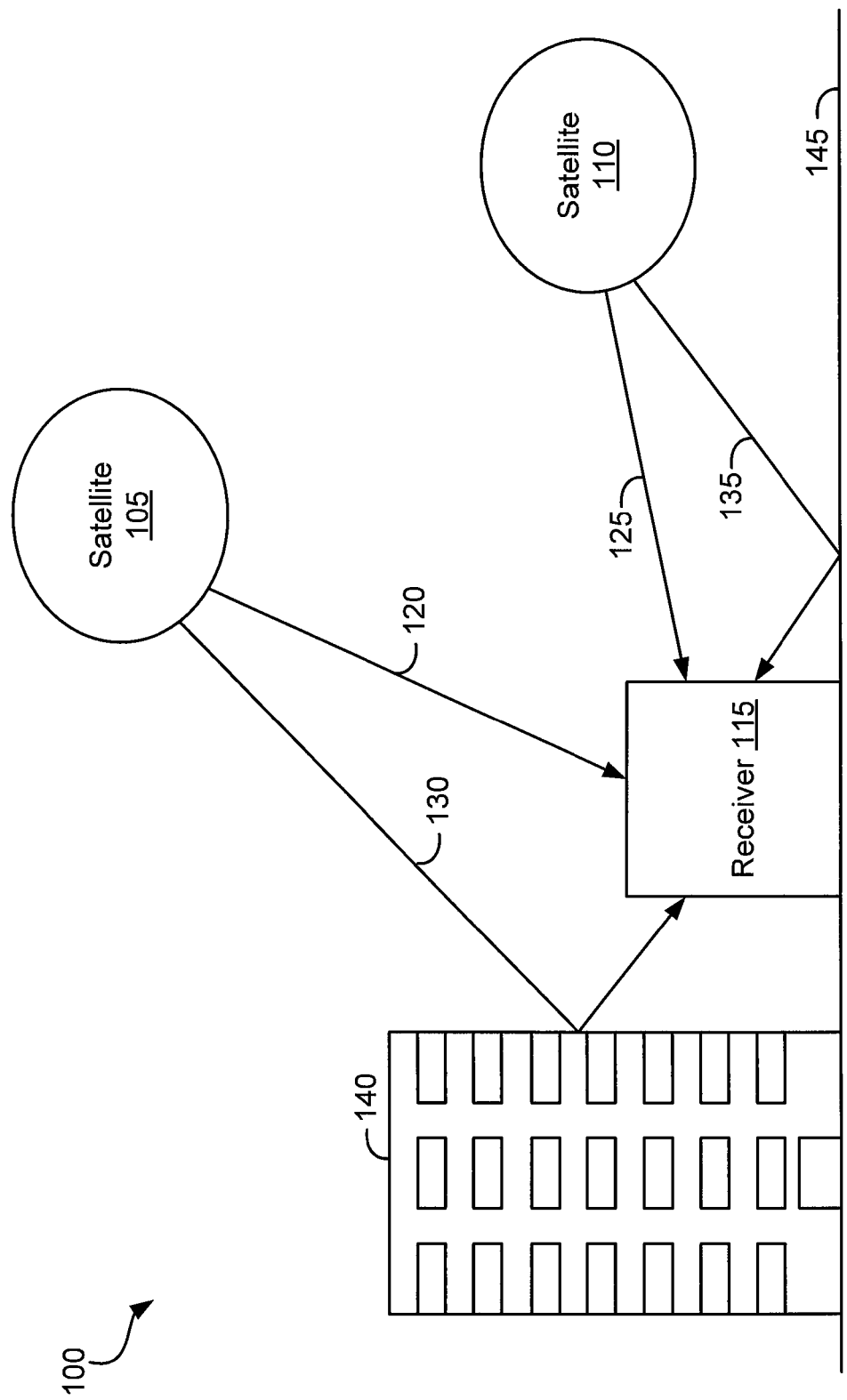
FIG. 1 is a block diagram that illustrates a system for monitoring navigation state errors.

FIG. 1 is a block diagram that illustrates a system 100 for monitoring navigation state errors. The system 100 comprises a plurality of satellites 105, 110 and a receiver 115. Although only one receiver 115 is shown in the system 100, the system 100 can include multiple receivers 115. The satellites 105, 110 include, but are not limited to, GPS satellites and/or other global navigation satellite system (GNSS) satellites, such as, for example, the Galileo and the GLONASS satellites. The satellites 105, 110 generally orbit above the location of the receiver 115 at any given time.

The receiver 115 includes, but is not limited to, GPS timing receivers and navigation receivers, both of which can be further embedded into cell phones and personal digital assistants (PDAs), among others. The satellites 105, 110 transmit signals to the receiver 115, which uses the GPS signals to determine the location, speed, and direction of the receiver 115. The transmitted signals from the satellites 105, 110 reach the receiver 115 by two or more paths, which is a propagation phenomenon called multipath. The receiver 115 is further described in relation to FIG. 2.

Causes of multipath include refraction and reflection from terrestrial objects, such as mountains and buildings. For example, the transmitted signals 120, 125 from the respective satellites 105, 110 directly reach the receiver 115, the signals 120, 125 of which are known as direct-path signals. The transmitted signals 130, 135 from the satellites 105, 110 reflect from a building 140 and ground 145, respectively, the signals 130, 135 of which are know as indirect-path or reflected signals. Multipath is composed of the direct-path signal and one or more indirect-path signals from the same satellite. Reflected signals generally without direct-path signals are special cases of multipath.

Since a multipath signal goes through a longer path than the corresponding direct-path signal, measured pseudorange $\rho$ due solely to multipath 130, 135 is usually larger that of direct-path signals. 120, 125. Pseudorange $\rho$ can be calculated as follows:

$$\rho = c \times (t_{received} - t_{transmission}) \quad \text{(Eq. 1)}$$

where c refers to the speed of light, $t_{received}$ refers to the time the receiver 115 received the signals from the satellites 105, 110, and $t_{transmission}$ refers to the time the satellite 105, 110 transmitted the signal to the receiver 115. The geometry range r between a satellite and the receiver can be calculated as follows:

$$r = |satellite\_position - receiver\_position| \quad \text{(Eq. 2)}$$

where the satellite position can be calculated based on ephemeris and the receiver position can be calculated based on a navigation state.

Pseudorange residual $\Delta$ can be calculated based on the pseudorange $\rho$ and geometry range r as follows:

$$\Delta = \rho - r - c \cdot \delta t_{rx} \quad \text{(Eq. 3)}$$

where $\delta t_{rx}$ represents the estimated receiver clock bias, which is generally one element of the navigation state vector. Pseudorange residual thus gives an indication of the accuracy of the pseudorange measurement. It can be utilized by the navigation manager 410 (FIG. 4) (e.g., Least Squares/Weighted Least Squares and Kalman filtering) to update the navigation state, i.e. to adjust receiver position and associated error variances, or to compute the associated gain, weight or probability of the corresponding pseudorange measurement. Since the pseudorange measurement is a function of the multipath pseudorange residual can also be used by the Failure Detection and Exclusion (FDE) manager 415 (FIG. 4) to detect and exclude the multipath measurement from the navigation manager 410. However, the integrity and accuracy of pseudorange residual $\Delta$ depend on receiver clock bias $\delta t_{rx}$ and geometry range r (more specifically, receiver position), both of which are based on the navigation state. If the navigation state has errors, calculated measurement residuals could be misleading for FDE algorithms due to their degraded reliability associated with indicating the accuracy of the pseudorange measurement. For example, good measurements could have large residuals, while bad measurements could have small residuals, instead. Therefore, without a reasonable true navigation state, FDE methods operating on the pseudorange residual may not reliably detect measurements, resulting in a high probability of both false alarms and miss detections, bad GPS position fix can be delivered, and the wrong navigation state can unfortunately be continuously used. Thus, the ability to reliably and quickly determine navigation state error and to distinguish it from pseudorange measurement error can facilitate improving the FDE manager performance and therefore navigation performance. Operations for monitoring navigation state errors are described in relation to FIGS. 5 and 6.

Figure 2:
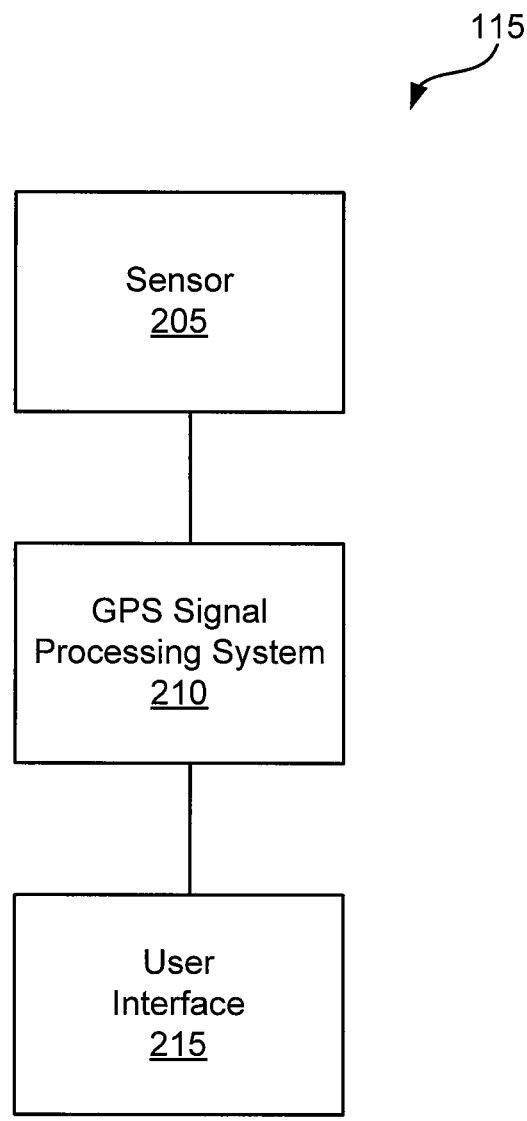
FIG. 2 is a block diagram that illustrates an embodiment of a receiver, such as that shown in FIG. 1.

FIG. 2 is a block diagram that illustrates an embodiment of the receiver 115, such as that shown in FIG. 1. The receiver 115 includes, but is not limited to, sensor(s) 205, a GPS signal processing system 210, and a user interface 215. It should be noted that the sensor 205 may not be included in some receivers 115. The sensor 205 can include, but is not limited to, inertial navigation system (INS) and dead reckoning (DR) sensors that include, for example, accelerometers, gyroscopes, and vehicle wheel sensors among others. In general, accelerometers measure the vehicle acceleration and the gyroscopes measure orientation or angular change rate. In general, the sensor 205 can detect the difference between the moving and stationary vibrations of a vehicle. INS is one kind of dead reckoning (DR) system. Besides the INS, another DR system is a differential wheel speed sensor system, in which the distance traveled and the heading change can be derived based on one or two pairs of left and right wheel sensors. Based on the sensor measurements, the INS/DR can calculate the traveled distance and direction change through integration.

The GPS signal processing system 210 includes a navigation state error monitoring manager 405 (FIG. 4) that monitors the status of navigation state. The GPS signal processing system 210 can include, but is not limited to, a GPS receiver, among other receivers. Not only is the GPS receiver capable of computing position fixes by itself without sensors 205, but it can also be integrated with the INS/DR. The INS/DR and GPS can be integrated in a loose, tight, or deep way. The integrated system can not only eliminate the error growth problem of an INS/DR but also overcome lots of difficulties faced by the GPS receiver in, for example, urban canyon environments. The GPS signal processing system 210 is further described in relation to FIGS. 3 and 4. Operations of the navigation state error monitoring manager 405 are described in relation to FIGS. 5 and 6.

Figure 3:
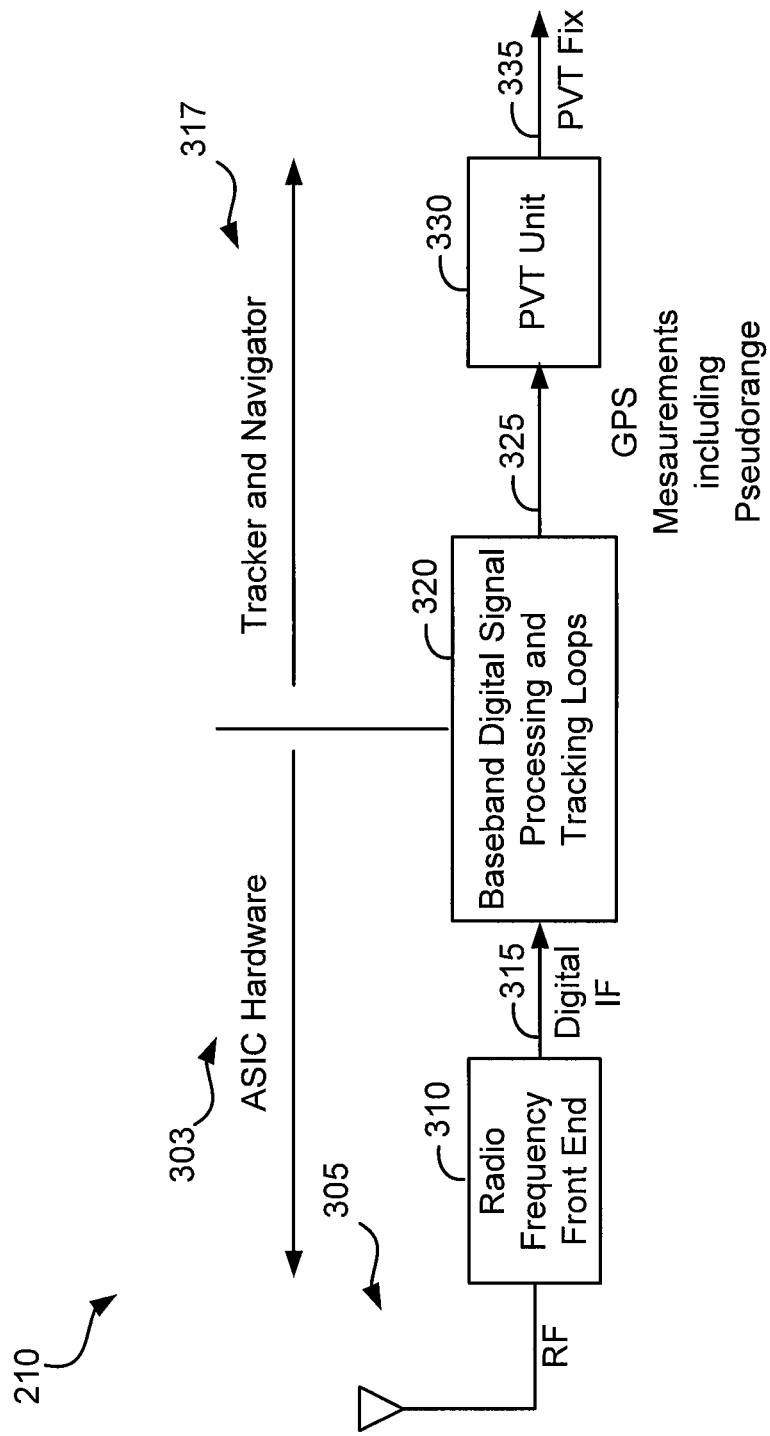
FIG. 3 is a block diagram that illustrates an embodiment of a GPS signal processing system, such as that shown in FIG. 2, which monitors navigation state errors.

FIG. 3 is a block diagram that illustrates an embodiment of a GPS signal processing system, such as that shown in FIG. 2, which monitors navigation state errors. The GPS signal processing system 210 can include, but is not limited to, an antenna 305, an application-specific integration circuit (ASIC) hardware 303 and a tracker and navigator 317. The ASIC hardware 303 includes a radio frequency (RF) front end 310 and a baseband digital signal processing (DSP) device 320. The navigation tracker and navigator 317 includes, but is not limited to, tracking loops unit 320 that controls the DSP and a position, velocity, and time (PVT) unit 330 . The tracker and navigator 317 can be, for example, in a form of software running inside a microprocessor, among others.

The antenna 305 receives GPS signals for visible satellites, and sends the received signals to the RF front end unit 310 that down-converts, magnifies, filters, and digitizes the received signals into digital intermediate frequency (IF) signals 315. Such digital IF signals 315 are input to the baseband DSP unit 320 that acquires and tracks the received signals and then generates pseudorange measurements 325 according to the received GPS signals. In one embodiment, the baseband DSP 320 includes a carrier tracking loop (not shown) that computes an estimated delta range and a code tracking loop (not shown) that computes an estimated PR.

The baseband DSP unit 320 delivers the generated pseudorange measurements 325 to the PVT unit 330 that computes a GPS solution or position fix 335 based on the generated pseudorange measurements 325 with or without the aid of an external aiding sensor or system. The PVT unit 330 includes, but is not limited to, a Least-Square (LS) or Kalman filtering, among others.

Alternatively or additionally, the baseband DSP unit 320 or the PVT unit 330 includes a navigation state error manager 405 (FIG. 4) that can detect errors in the navigation state before sending the GPS measurements to the PVT unit 330 or calculating the position fix 335, respectively. Alternatively or additionally, the navigation state error manager 405 can be independent and separate of the baseband DSP unit 320 and the PVT unit 330. The PVT unit 330 is further described in relation to FIG. 4. Operations of the navigation state error manager 405 are described in relation to FIGS. 5 and 6. It should be noted that in an AGPS system, the server 125 receives the GPS measurements from the receivers 115, calculates a position fix for the receiver, and sends the position fix to the receivers 115 and/or to other dispatchers.

Figure 4:
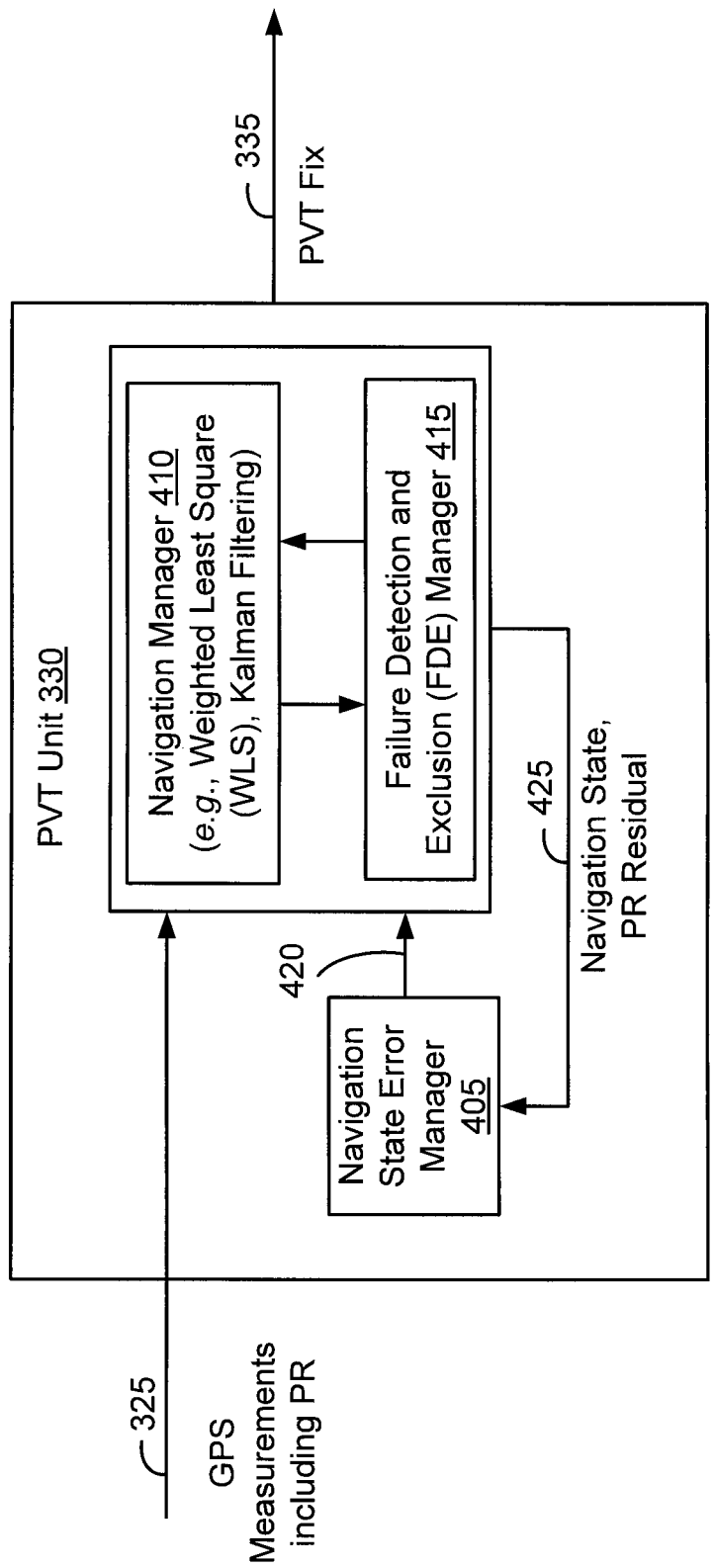
FIG. 4 is a block diagram that illustrates an embodiment of a position, velocity, and time (PVT) unit, such as that shown in FIG. 3, which includes a navigation state error manager for monitoring navigation state errors.

FIG. 4 is a block diagram that illustrates an embodiment of a position, velocity and time (PVT) unit, such as that shown in FIG. 3, which includes a navigation state error manager 405 for monitoring navigation state errors. As mentioned above, the navigation state error manager 405 can also be a part of the baseband DSP unit 320 or independent and separate of the baseband DSP unit 320 and the PVT unit 330.

GPS measurements, such as, pseudoranges (PRs) and Dopplers, among others, are sent to the navigation state error manager 405, navigation manager 410, and failure detection and exclusion (FDE) manager 415. The navigation manager 410 calculates measurement residuals based on the GPS measurements 325, among others, and updates navigation state 425, part of which can be output as a position fix 335. Based on PR residuals and either the updated navigation state or sometimes the previous navigation state, the FDE manager 415 detects and excludes failed pseudorange measurements from the navigation manager 410. Alternatively or additionally, the navigation manager 410 can re-estimate the navigation state after bad measurements are excluded. In other words, the navigation manager 410 and FDE manager 415 could be mingled together.

The navigation state error monitoring manager 405 determines whether the navigation state is right or wrong based on the PR residuals and the navigation state via line 425. Though shown as a separate part from FDE manager 415, the navigation state error monitoring manager 405 can also be mingled with the FDE manager 415. In general, if the navigation state is determined to be wrong, the navigation state error monitoring manager 405 sends an error message to the navigation manager 410 and/or failure detection and exclusion manager 415 via line 420. Otherwise, if the navigation state is determined to be correct by the navigation state error monitoring manager 405, then calculations done at the navigation manager 410 and FDE manager 415 are assumed to be accurate and not be intervened. Operations of the navigation state error monitoring manager 405 are further described in relation to FIGS. 5 and 6.

Figure 5:
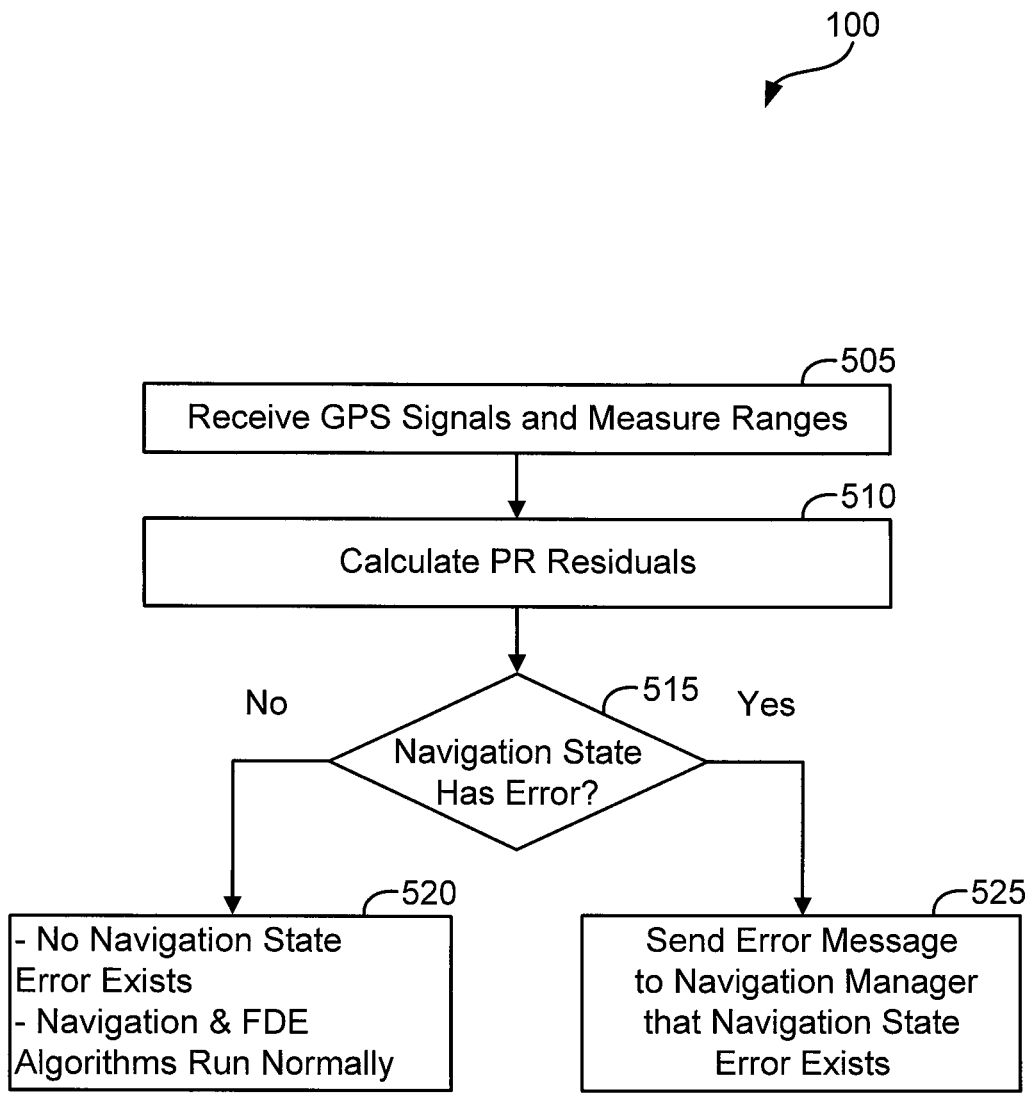
FIG. 5 is a flow diagram that illustrates an embodiment of the architecture, functionality, and/or operation of the system, such as that shown in FIG. 1, which monitors navigation state errors.

FIG. 5 is a flow diagram that illustrates an embodiment of the architecture, functionality, and/or operation of the system, such as that shown in FIG. 1, which monitors navigation state errors. This is accomplished by detecting the existence of large pseudorange residual for multiple satellites or channels over long distance traveled by the receiver. Since multipath phenomenon is highly sensitive to receiver location and motion, multipath contribution to the pseudorange residual most likely disappears after the receiver travels over a long distance. Thus the existence of any large pseudorange residual for multiple channels over space indicates a high probability of navigation state error. Beginning with step 505, the receiver 115 receives GPS signals from satellites 105, 110, and measures their ranges (e.g., PRs) and range rate (e.g., Doppler). In step 510, the navigation manager 410 calculates pseudorange (PR) residuals based on the navigation state and PR measurements.

In step 515, the navigation state error manager 405 is configured to determine whether a navigation state has errors based on the calculated PR residuals and navigation state. If the navigation state is determined to have errors, the navigation state error manager 405, in step 520, sends an error message to the navigation manager 410 of the receiver 115 indicating that the navigation state has errors. If the navigation state is determined not to have errors, the navigation manager 410, in step 525, continues to receive the GPS measurements.

Figure 6:
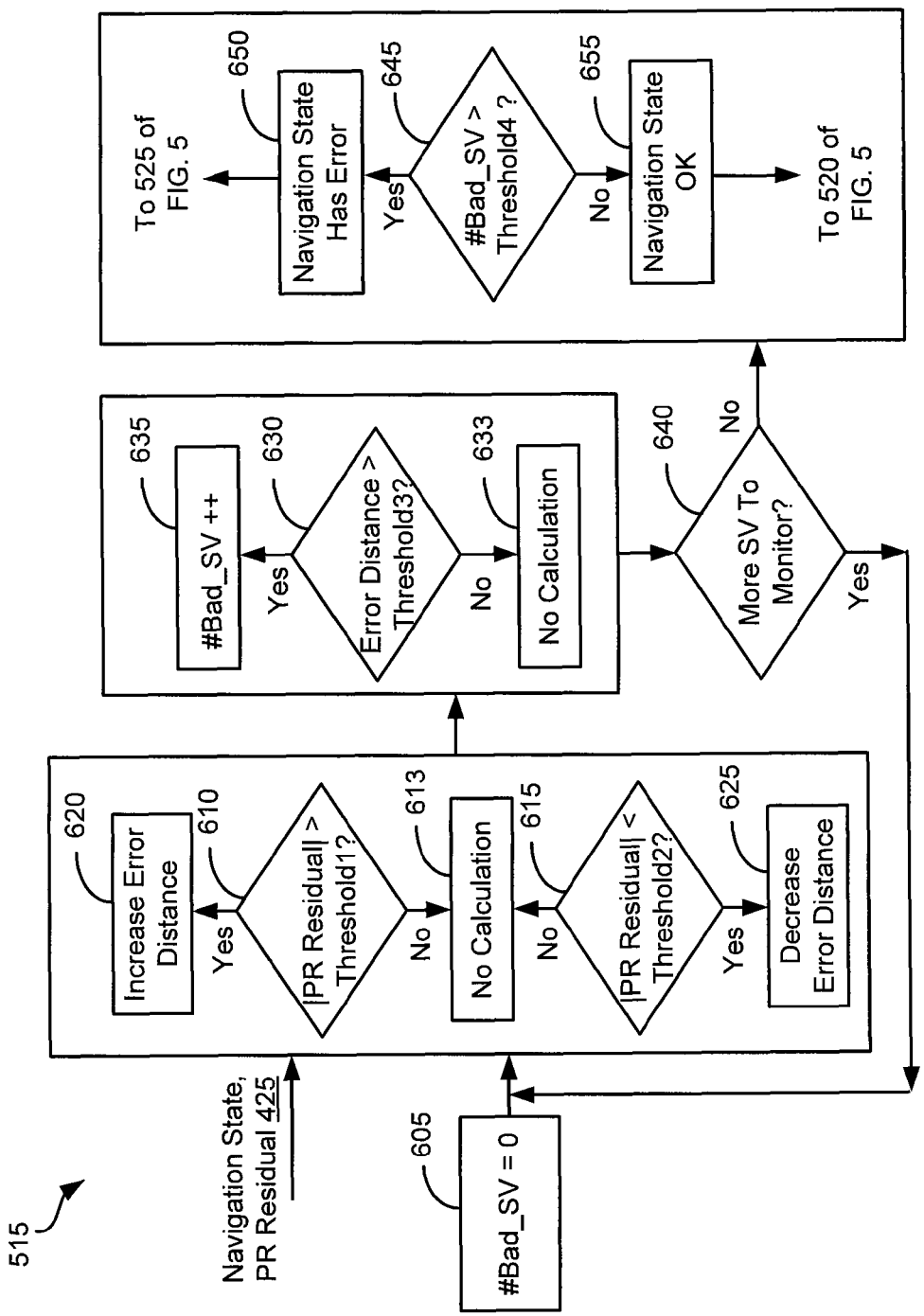
FIG. 6 is a flow diagram that illustrates an embodiment of the architecture, functionality, and/or operation of the navigation state error manager, such as that shown in FIG. 4, for determining whether navigation state has errors, such as that shown in step 515 of FIG. 5.

FIG. 6 is a flow diagram that illustrates an embodiment of the architecture, functionality, and/or operation of the navigation state error manager 405, such as that shown in FIG. 4, for determining whether navigation state errors exist, such as that shown in step 515 of FIG. 5. In general, the navigation state manager 405 calculates an error distance traveled by the receiver 115 (FIG. 1) between each satellite 105, 110 (FIG. 1) and the receiver 115. Beginning with step 605, the navigation state manager 405 assumes that there is a predetermined number of satellite vehicles that have errors. In this example, the navigation state manager 405 assumes that there is zero satellite vehicle sending errors. In step 610, the navigation state error manager 405 determines whether the PR residual from line 425 (FIG. 4) exceeds a first threshold. If the PR residual is determined to exceed the first threshold, the navigation state error manager 405 in step 620 calculates the error distance by adding the error distance traveled by the receiver 115.

Alternatively or additionally, in step 615, the navigation state error manager 405 determines whether the PR residual from line 425 exceeds a second threshold. If the PR residual is determined to exceed the second threshold, the navigation state error manager 405 in step 625 calculates the error distance by subtracting the error distance traveled by the receiver 115. If the PR residual did not exceed the first and second thresholds, then the navigation state error manager 405 in step 613 does no calculation to the error distance.

An exemplary algorithm associated with steps 610, 615, 620, 625 for calculating the error distance can be expressed as follows:

$$\begin{aligned}&\text{If } |\text{residual}| > \text{threshold 1} \\ &\quad d = d + \text{dist} \times \text{ratio} \\ &\text{else if } |\text{residual}| < \text{threshold 2} \\ &\quad d = d - \text{dist} \times \text{ratio} \\ &\text{end}\end{aligned} \quad (\text{Eq. 4})$$

where threshold 1 and threshold 2 refer to PR residual thresholds and are functions of satellite elevation, d refers to a channel's error distance and generally has a value greater than or equal to zero, dist refers to a (horizontal) distance traveled by the receiver 115 measured in the previous time, and ratio refers to a function of signal-to-noise ratio. The value of the ratio is generally between 0 and 1, and is directly proportional to the value of the signal-to-noise ratio. Thus, the greater the distance over which the pseudorange residual exceeds thresholds with high signal-to-noise ratio, the greater the accumulated error distance and the greater the likelihood of navigation state error. Conversely, the greater the distance over which the pseudorange residual falls below threshold 2 with high signal-to-noise ratio, the smaller the accumulated error distance and the smaller the probability of navigation state error. When the previously tracked signal is lost at the current epoch, then d could be reset to zero or reduced by the traveled distance.

In step 630, the navigation state error manager 405 determines whether the error distance exceeded a third threshold. If the error distance is determined to exceed the third threshold, the navigation state error manager 405, in step 635, adds the number of satellite vehicles associated with the calculated error distance that exceeded the third threshold. In essence, the navigation state error manager 405 counts the number of satellite vehicles that has shown large residuals over the long enough distance. Alternatively or addition, if the error distance did not exceed the third threshold, then the navigation state error manager 405 in step 633 does no calculation to the number of satellite vehicles. An exemplary algorithm associated with steps 630 and 635 can be expressed as follows:

$$\begin{aligned}&\#\_\text{short}\_\text{distance} = 0 \\ &\#\_\text{long}\_\text{distance} = 0 \\ &\text{for each channel} \\ &\quad \text{if } d > 100 \text{ m} \\ &\quad\quad \#\_\text{short}\_\text{distance} ++ \\ &\quad \text{if } d > 200 \text{ m} \\ &\quad\quad \#\_\text{long}\_\text{distance} ++ \\ &\text{end for loop}\end{aligned} \quad (\text{Eq. 5})$$

where 100 meters and 200 meter are exemplary distance thresholds, d refers to the channel's error distance, #_short_distance refers to the number of satellite vehicles 105, 110 associated with the calculated error distance that passed the 100 meters threshold, and #_long_distance refers to the number of satellite vehicles 105, 110 associated with the calculated error distance that passed the 200 meters threshold.

In step 640, the navigation stated error manager 405 determines whether there are more satellite vehicles 105, 110 to be monitored. Responsive to determining that there are more satellite vehicles 105, 110 to be monitored, the navigation stated error manager 405 returns to steps 610 and 615. If there are no more satellite vehicles 105, 110 to be monitored, the navigation stated error manager 405 in step 645 determines the number of satellite vehicles 105, 110 having large residuals over a long enough distance passed a fourth threshold. In step 650, if the multiple satellite vehicles 105, 110 have large residuals over enough long distance, this gives a good indication that the navigation state has errors. In step 655, if the multiple satellite vehicles 105, 110 do not have large residuals over enough long distance, this gives a good indication that the navigation state has no error or minimum errors.

An exemplary algorithm associated with steps 645, 650, 655 for calculating whether the navigation state has errors in a certain number of satellite vehicles 105, 110 over a certain distance is as follows:

$$\begin{aligned}&\text{if } (\#\_\text{short}\_\text{distance} \geq 3 \text{ or } \#\_\text{long}\_\text{distance} \geq 2) \\ &\quad \text{send error message indicating} \\ &\quad \text{that the navigation state has errors} \\ &\text{else} \\ &\quad \text{Assume the navigation state is accurate} \\ &\quad \text{and continue normal operation}\end{aligned} \quad (\text{Eq. 6})$$

where 2 and 3 are exemplary channel thresholds, #_short_distance refers to the number of satellite vehicles 105, 110 associated with the calculated error distance that passed the 100 meters threshold, and #_long_distance refers to the number of satellite vehicles 105, 110 associated with the calculated error distance that passed the 200 meters threshold.

In the exemplary algorithm, if #_short_distance or #_long_distance is greater or equal to 3 or 2, respectively, then the navigation state error manager 405 sends an error message indicating that the navigation state has errors, such as that shown in step 530 of FIG. 5. If #_short_distance and #_long_distance is not greater or equal to 2 or 3, respectively, then the navigation state manager 410 continues to receive GPS measurements and calculate a position fix, such as that shown in step 525 of FIG. 5.

Figure 7:
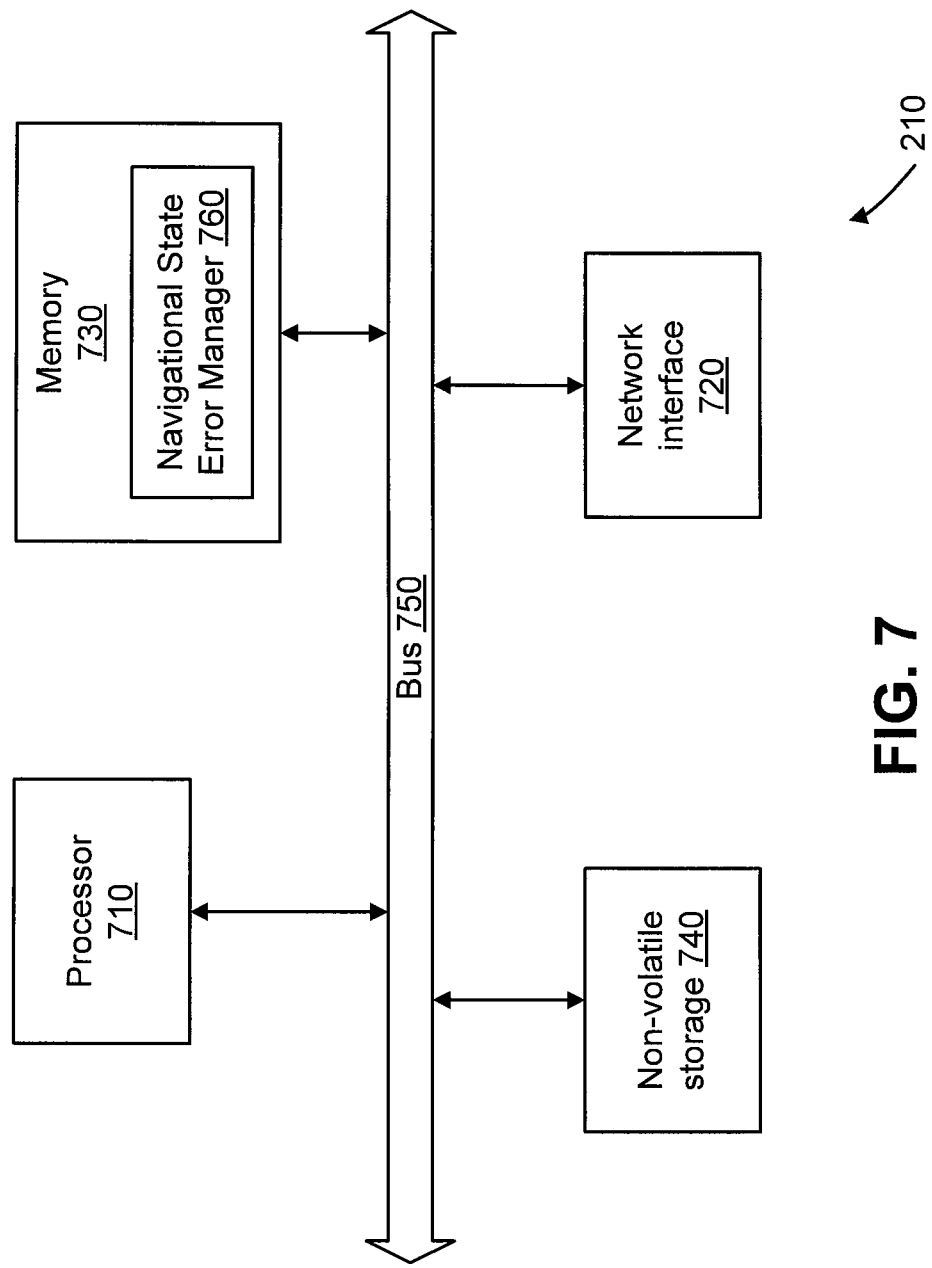
FIG. 7 is a block diagram that illustrates an embodiment of a GPS signal process system 210, such as that shown in FIG. 2.

FIG. 7 is a block diagram that illustrates an embodiment of the GPS signal process system 210, such as that shown in FIGS. 2 and 3. The GPS signal process system 210 includes a processor 710, a network interface 720, memory 730, and non-volatile storage 740. Examples of non-volatile storage include, for example, a hard disk, flash RAM, flash ROM, EEPROM, etc. These components are coupled via a bus 750. The memory 730 includes a navigational state error manager 760 that facilitates monitoring navigation state errors. Operations of the navigational state error manager 760 can be described in detail in relation to FIGS. 4 and 5. The memory 730 contains instructions which, when executed by the processor 710, implement at least a portion of the methods and systems disclosed herein, particularly the navigational state error manager 760. Omitted from FIG. 7 are a number of conventional components, known to those skilled in the art that is unnecessary to explain the operation of the device 210.

The systems 100 and methods 515 disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed:

1. A method for monitoring navigation state errors, the method comprising:
   receiving GPS signals from signal sources by a mobile receiver;
   calculating, by the mobile receiver, a distance traveled by the mobile receiver;
   calculating, by the mobile receiver, over the distance traveled by the mobile receiver, pseudorange (PR) residuals based on respective differences between pseudoranges and geometric ranges between the signal source and the mobile receiver;
   determining, by the mobile receiver, a number of the PR residuals that are greater than a threshold at locations over the calculated distance;
   determining, by the mobile receiver, that a navigation state of the mobile receiver has errors if the number of the PR residuals that are greater than the threshold is greater than a predetermined number; and
   responsive to determining that the navigation state has errors, correcting, by the mobile receiver, the navigation state and calculating the position of the mobile receiver.

2. The method as defined in claim 1, wherein calculating the distance traveled by the receiver having the PR residuals is achieved by adding the distance traveled by the receiver to the accumulated distance whenever the PR residuals pass a first threshold.

3. The method as defined in claim 1, wherein calculating the distance traveled by the receiver having the PR residuals is achieved by subtracting the distance traveled from the accumulated distance whenever the PR residuals fall below a second threshold.

4. The method as defined in claim 1, further comprising determining the number of satellite vehicles with large PR residuals over the calculated distance.

5. The method as defined in claim 4, wherein determining the number of satellite vehicles with PR residuals over the calculated distance is achieved by adding the number of satellite vehicles associated with the calculated distance that passed a first distance threshold.

6. The method as defined in claim 5, wherein determining the number of satellite vehicles with PR residuals over the calculated distance is achieved by adding the number of satellite vehicles associated with the calculated distance that passed a second distance threshold, the first distance threshold having a different value than the second distance threshold.

7. The method as defined in claim 5, further comprising determining whether the determined number of satellite vehicles associated with the first distance threshold passed a first channel threshold.

8. The method as defined in claim 6, further comprising determining whether the determined number of satellite vehicles associated with the second distance passed a second channel threshold.

9. The method of claim 1, further comprising:
determining that the navigation state of the mobile receiver does not have errors if the number of the PR residuals that are greater than the threshold is less than or equal to the predetermined number; and
responsive to determining that the navigation state does not have errors, excluding pseudoranges used to calculate the number PR residuals that are greater than the threshold from calculating the position of the mobile receiver.

10. A system for monitoring navigation state errors comprising:
a mobile receiver that is configured to receive GPS signals, calculate a distance traveled by the mobile receiver, and calculate over the distance traveled by the mobile receiver, pseudorange (PR) residuals based on respective differences between pseudorange and geometric ranges between the signal source and the mobile receiver, the mobile receiver including a navigation state error manager that is configured to:
  determine a number of the PR residuals that are greater than a threshold at locations over the calculated distance,
  determine that a navigation state of the mobile receiver has errors if the number of PR residuals that are greater than the threshold is greater than a predetermined number, and
  responsive to determining that the navigation state has errors, correcting the navigation state and calculating the position of the mobile receiver.

11. The system as defined in claim 10, wherein the navigation state error manager calculates the distance traveled by the receiver having the PR residuals by adding the distance traveled by the receiver to the accumulated distance whenever the PR residuals pass a first threshold.

12. The system as defined in claim 10, wherein the navigation state error manager calculates the distance traveled by the receiver having the PR residuals by subtracting the distance traveled by the receiver from the accumulated distance whenever the PR residuals fall below a second threshold.

13. The system as defined in claim 10, wherein the navigation state error manager is further configured to determine the number of satellite vehicles with large PR residuals over the calculated distance.

14. The system as defined in claim 13, wherein the navigation state error manager determines the number of satellite vehicles with PR residuals over the calculated distance by adding the number of satellite vehicles associated with the calculated distance that passed a first distance threshold.

15. The system as defined in claim 14, wherein the navigation state error manager determines the number of satellite vehicles with PR residuals over the calculated distance by adding the number of satellite vehicles associated with the calculated distance that passed a second distance threshold, the first distance threshold having a different value than the second distance threshold.

16. The system as defined in claim 14, wherein the navigation state error manager determines whether the determined number of satellite vehicles associated with the first distance threshold passed a first channel threshold.

17. The system as defined in claim 15, wherein the navigation state error manager determines whether the determined number of satellite vehicles associated with the second distance threshold passed a second channel threshold.

18. A mobile GPS receiver comprising:
(a) an antenna that is configured to receive GPS signals from signal sources;
(b) a baseband digital signal processing device that is configured to:
  (1) receive the GPS signals from the antenna,
  (2) calculate a distance traveled by the mobile GPS receiver,
  (3) calculate, over the distance traveled by the GPS receiver, pseudoranges (PRs) associated with the GPS signals,
  (4) calculate, over the distance traveled by the GPS receiver, at least one geometric range between at least one signal source and the GPS receiver; and
  (5) calculate pseudorange (PR) residuals based on respective differences between the pseudoranges and the geometric ranges between the signal source and the receiver and
(c) a navigation state error manager that is configured to:
  (1) determine a number of the PR residuals that are greater than a threshold at locations over the calculated distances,
  (2) determine that a navigation state of the mobile GPS receiver has errors if the number of PR residuals that are greater than the threshold is greater than a predetermined number, and
  (3) responsive to determining that the navigation state has errors, correcting the navigation state and calculating the position of the mobile receiver.

19. The receiver as defined in claim 18, wherein the navigation state error manager calculates the distance traveled having the PR residuals by at least one of the following:
adding the distance traveled by the receiver to the accumulated distance whenever the PR residuals passed a first threshold, and
subtracting the distance traveled by the receiver from the accumulated distance whenever the PR residuals fall below a second threshold.

20. The receiver as defined in claim 18, wherein the navigation state error manager is further configured to determine the number of satellite vehicles with large PR residuals over the calculated distance.

21. The receiver as defined in claim 20, wherein the navigation state error manager determines the number of satellite vehicles with PR residuals over the calculated distance by adding the number of satellite vehicles associated with the calculated distance that passed a first distance threshold.

22. The receiver as defined in claim 21, wherein the navigation state error manager determines the number of satellite vehicles with PR residuals over the calculated distance by adding the number of satellite vehicles associated with the calculated distance that passed a second distance threshold, the first distance threshold having a different value than the second distance threshold.

23. The receiver as defined in claim 21, wherein the navigation state error manager determines whether the determined number of satellite vehicles associated with the first distance threshold passed a first channel threshold.

24. The receiver as defined in claim 22, wherein the navigation state error manager determines whether the determined number of satellite vehicles associated with the second distance threshold passed a second channel threshold.

* * * * *

UNITED STATES PATENT AND TRADEMARK OFFICE
CERTIFICATE OF CORRECTION

PATENT NO. : 8,670,882 B2  Page 1 of 1
APPLICATION NO. : 12/061726
DATED : March 11, 2014
INVENTOR(S) : Xie et al.

It is certified that error appears in the above-identified patent and that said Letters Patent is hereby corrected as shown below:

In the Specification

In Column 7, Lines 63-64, delete "thresholds" and insert -- threshold 1 --, therefor.

Signed and Sealed this
Third Day of June, 2014

Michelle K. Lee
*Deputy Director of the United States Patent and Trademark Office*